United States Patent
Narimoto et al.

(10) Patent No.: US 7,584,994 B2
(45) Date of Patent: Sep. 8, 2009

(54) AIRBAG APPARATUS

(75) Inventors: Yukitoshi Narimoto, Tokyo (JP);
Masahiro Hasebe, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/882,366

(22) Filed: Aug. 1, 2007

(65) Prior Publication Data
US 2008/0054613 A1 Mar. 6, 2008

(30) Foreign Application Priority Data
Sep. 5, 2006 (JP) .............. 2006-240518

(51) Int. Cl.
B60R 21/16 (2006.01)
(52) U.S. Cl. ................... 280/743.1
(58) Field of Classification Search ........... 280/743.1, 280/743.2, 729
See application file for complete search history.

(56) References Cited
U.S. PATENT DOCUMENTS

| | | | | |
|---|---|---|---|---|
| 6,595,549 | B2 * | 7/2003 | Bohn et al. | 280/743.1 |
| 6,834,886 | B2 * | 12/2004 | Hasebe et al. | 280/743.1 |
| 6,969,086 | B2 * | 11/2005 | Hasebe et al. | 280/743.1 |
| 7,000,943 | B2 | 2/2006 | Hasebe et al. | |
| 7,243,947 | B2 * | 7/2007 | Bosch | 280/743.1 |
| 7,360,790 | B2 * | 4/2008 | Hasebe et al. | 280/743.2 |
| 7,364,188 | B2 * | 4/2008 | Hasebe et al. | 280/732 |
| 7,458,605 | B2 * | 12/2008 | Hasebe et al. | 280/729 |
| 2003/0218325 | A1 | 11/2003 | Hasebe et al. | |
| 2004/0145161 | A1 | 7/2004 | Hasebe et al. | |
| 2004/0155440 | A1 | 8/2004 | Hasebe et al. | |
| 2004/0195807 | A1 | 10/2004 | Hasebe et al. | |
| 2006/0028009 | A1 | 2/2006 | Hasebe et al. | |
| 2006/0049618 | A1 | 3/2006 | Bito | |
| 2006/0103118 | A1 | 5/2006 | Hasebe | |
| 2006/0249934 | A1 * | 11/2006 | Hasebe | 280/729 |

FOREIGN PATENT DOCUMENTS

| | | |
|---|---|---|
| EP | 1 364 838 A2 | 11/2003 |
| EP | 1 452 403 A1 | 9/2004 |
| JP | 2003-335203 | 11/2003 |
| JP | 2004-244005 | 9/2004 |
| JP | 2004-314933 | 11/2004 |
| JP | 2006-176091 | 7/2006 |

OTHER PUBLICATIONS

European Search Report dated Mar. 19, 2009, received in corresponding European application No. 07013596.7 (3 pgs.).

* cited by examiner

*Primary Examiner*—Faye M. Fleming
(74) *Attorney, Agent, or Firm*—Foley & Lardner LLP

(57) ABSTRACT

An airbag and an airbag apparatus is provided including a right half and left half airbag, in which a stitching trouble therefore is saved, and a motor vehicle provided with the airbag apparatus. An airbag is formed of an inside panel extending from a tip end of a right half airbag up to a tip end of a left half airbag, while passing through each facing surface of both a right half airbag and the left half airbag, and a one-sheet outer panel constituting an outer surface of the right half airbag (right outer surface), an outer surface of the left half airbag (left outer surface), and a surface surrounding a base end chamber (mouth surface).

21 Claims, 6 Drawing Sheets

AIRBAG APPARATUS

BACKGROUND

The present invention relates to an airbag for protecting an occupant in collision of a motor vehicle or the like, and to an airbag apparatus therefore, and specifically to an airbag provided with a left half airbag and a right half airbag respectively inflating at a left side and right side in front of the occupant, and an airbag apparatus including the airbag. Further, the present invention relates to a motor vehicle provided with the airbag apparatus.

As an airbag for protecting an occupant in collision of a motor vehicle or the like, an airbag described in Japanese Unexamined Patent Application Publication No. 2004-244005 (incorporated by reference herein) is known as a related art of an airbag constructed to have a left half airbag and a right half airbag, respectively inflated at a left side and right side in front of the occupant, and to be inflated by a common inflator.

The airbag described in Japanese Unexamined Patent Application Publication No. 2004-244005 is an airbag inflated in a direction where a tip end side of the airbag recedes from a base end side by blowing-out gas of the inflator disposed at the base end side, and is an airbag provided with a left half airbag inflating at a left side in front of the occupant, and a right half airbag inflating at a right side in front of the occupant. The airbag is formed of an inside panel extending from a tip end of the right half airbag up to a tip end of the left half airbag, while passing through each of facing faces of the airbag of both the right half and left half, a right outside panel constituting an outer surface of the right half airbag, a left outside panel constituting an outer surface of the left half airbag, and a base end side panel constituting a base end side of the airbag. In the airbag described above, a base end chamber surrounded by the base end side panel is formed, and the gas of the aforementioned inflator is supplied into the left half airbag and the right half airbag via the base end chamber.

In the airbag described in Japanese Unexamined Patent Application Publication No. 2004-244005, in a case that the inflator is activated, the base end chamber at the base end side is inflated in advance, and then the left half airbag and the right half airbag are inflated. The base end chamber at the base end side, which is inflated in advance, is brought into contact with a motor vehicle member such as an instrumental panel or the like, and a posture thereof becomes stable. Therefore, postures of the left half airbag and the right half airbag become stable not only at a time on completion of an inflating operation but also in a halfway of the inflation.

Further, the gas is supplied from the base end chamber to the respective left side and right side airbags, even when the inflator is that of a type where a larger amount of the gas is blown out toward either one of the left side and right side compared to the other side, the gas is approximately uniformly supplied to the left half airbag and the right half airbag, and the same are brought to be approximately uniformly inflated.

Since an airbag described in the aforementioned Japanese Unexamined Patent Application Publication No. 2004-244005 is formed of a total of four panels of an inside panel, respective left and right outside panels, and a base end side panel, there are many stitching portions of each of the panels and therefore the stitching work is troublesome.

Accordingly, an airbag, an airbag apparatus and a motor vehicle provided with the airbag apparatus is needed that reduces the amount of stitching work needed to form a multiple panel airbag.

SUMMARY

According to one embodiment, an airbag inflated in a direction where a tip end side of the airbag recedes from a base end side by blowing-out gas of the inflator disposed at the base end side, is characterized in including a base end chamber disposed at the base end side, a left half airbag continuing into the base end chamber, and inflated at a left side in front of an occupant, and a right half airbag continuing into the base end chamber, and inflated at a right side in front of the occupant, in which the airbag is formed of an inside panel extending from a tip end of the right half airbag up to a tip end of the left half airbag, while passing through each facing surface of both the right half airbag and the left half airbag, and a one-sheet outer panel constituting an outer surface of the right half airbag (hereinafter referred to as "right outer surface"), an outer surface of the left half airbag (hereinafter referred to as "left outer surface"), and a surface surrounding a base end chamber (hereinafter referred to as "mouth surface").

According to another embodiment, an airbag is configured so that an upper edge of the left outer surface and an upper edge of the right outer surface are connected to an upper edge of the inside panel, and a lower edge of the left outer surface and a lower edge of the right outer surface are connected to a lower edge of the inside panel, and a tip end edge of the left outer surface and a tip end edge of the right outer surface are connected to a tip end edge of the inside panel, and the mouth surface is connected to an upper edge of a base end portion of the inside panel and a lower edge of the base end portion of the inside panel.

According to yet another embodiment, an airbag is configured so that the airbag includes a tether for coupling the base end portion of the inside panel and a base end portion of the mouth surface together in an inflated condition of the airbag.

According to still another embodiment, an airbag is configured so that when a height from the lower edge of the base end portion of the inside panel to the upper edge of the base end portion of the inside panel, in the inflated condition of the airbag, is defined as H, the tether is connected to a position at a height of about 0.2H or higher from the lower edge of the base end portion in the base end portion of the inside panel.

According to another embodiment, an airbag is configured so that a reinforcing cloth is attached to the aforementioned mouth surface.

According to yet another embodiment, an airbag is configured so that the tip end portions of the left half airbag and the right half airbag are not connected to each other, and a spatial portion opened to an occupant is formed between the tip end portions of the left half airbag and the right half airbag in the inflated condition of the airbag.

According to still another embodiment, an airbag is configured so that in the inflated condition of the airbag, a distance between each of the most tip end of the left half airbag and the most tip end of the right half airbag is set to be from about 150 mm to about 450 mm, and a distance in a horizontal direction from the most tip end to the deepest portion of the spatial portion is set to be from about 280 mm to about 480 mm.

According to another embodiment, an airbag apparatus is configured to include an airbag and an inflator for inflating the airbag, wherein the inflator is disposed at the base end side of the airbag.

According to yet another embodiment, a motor vehicle includes the airbag apparatus as described above mounted thereon.

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

An airbag 10 is provided with a right half airbag 12 for inflating at a right side in front of an occupant, a left half airbag 14 for inflating at a left side in front of the occupant, a base end chamber 16 allowed to communicate with a base end side of the right half airbag 12 and the left half airbag 14.

In a condition where the airbag 10 is inflated, there is no member to be hung across, such as a tie-panel, existing between each of tip end portions of the right half airbag 12 and the left half airbag 14. Namely, a spatial portion 13 formed between each of the tip end portions of both the right half airbag 12 and the left half airbag 14 is opened to the occupant (That is, toward a right side in FIG. 1 and FIG. 2).

In a condition where the airbag 10 is in a completed condition of an inflating operation, a distance between the most tip end of the right half airbag 12 and the most tip end of the left half airbag 14 is preferable to be from about 150 mm to about 450 mm, particularly, from about 170 mm to about 430 mm.

Further, a distance in a horizontal direction from the most tip end to the deepest portion of the spatial portion 13 is preferable to be from about 280 mm to about 480 mm, particularly, from about 310 mm to about 450 mm.

At an outer surface of the right half and left half airbags 12 and 14, a venthole 18 is provided.

A panel construction of the airbag 10 will be explained below. Incidentally, in the below explanation, a front (tip end) side of each panel refers to a tip end side in a inflating direction of the airbag 10, and a rear side refers to a base end side in the inflating direction.

The airbag 10 is formed of a total of two sheets of panels of an inside panel 20 and an outer panel 80.

The inside panel 20 is an elongated panel having approximately gourd-like shape, and a right side 20R and a left side 20L are formed by forming a twofold at a center thereof. In the inside panel 20, a right side 20R constitutes an inside surface of the right half airbag 12, and a left side 20L constitutes an inside surface of the left half airbag 14. As for the inside panel 20, hem portions of an entire periphery are formed of a lower hem 28 of the right side 20R, a tip end hem 21, an upper hem 22, an upper hem 23 in the vicinity of a folded-back portion constituting a deepest portion of an airbag valley, an upper hem 24 of the left side 20L, a tip end hem 25, lower hem 26, and a lower hem 27 in the vicinity of the folded-back portion.

The outer panel 80 includes a right outer surface 30 constituting an outer side surface of the right half airbag 12, a left outer surface 40 constituting an outer side surface of the left half airbag 14, and a mouth surface 50 constituting a surface surrounding the base end chamber 16.

An outer peripheral edge of the right outer surface 30 and the left outer surface 40 are respectively constructed by a tip end hems 31 and 41, upper hems 32 and 42, and lower hems 34 and 44.

The mouth surface 50 includes a right side surface 50A, a bottom surface 50B, a left side surface 50C, a right flap 50D constituting a right side of an upper surface, and a left flap 50E constituting a left side of the upper surface. A base end side of the aforementioned right outer surface 30 continues into the right side surface 50A, and a base end side of the left outer surface 40 continues into the left side surface 50C. In the mouth surface 50, each of the side surfaces 50A and 50C is folded into approximately a triangle, and a surface facing the tip end side of the airbag is opened.

An outer edge of the mouth surface 50 is formed of facing hems 51 and 52 of each of the approximately rectangularly shaped flaps 50D and 50E, front side hems 53 and 54 of the flaps 50D and 50E (flap front side hem), rear side hems 55 and 56 of the flaps 50D and 50E, a rear hem 57 facing the rear side hems 55 and 56, and a front side hem 60 of the bottom surface 50B (front side hem of the bottom portion).

The flap front side hems 53 and 54 respectively continue into the upper hems 32 and 42 of the right outer surface 30 and the left outer surface 40, and both end sides of the front side hem 60 of the bottom portion respectively continue into the lower hems 34 and 44 of the right outer surface 30 and the left outer surface 40.

When the airbag 10 is manufactured, firstly, each of the facing hems 51 and 52 of the flaps 50D and 50E of the mouth surface 50 is stitched. Thereby, the outer panel 80 is brought into a condition shown in FIG. 4. Incidentally, a mark S in FIG. 4 denotes a seam of the stitched portion.

Figure 4:
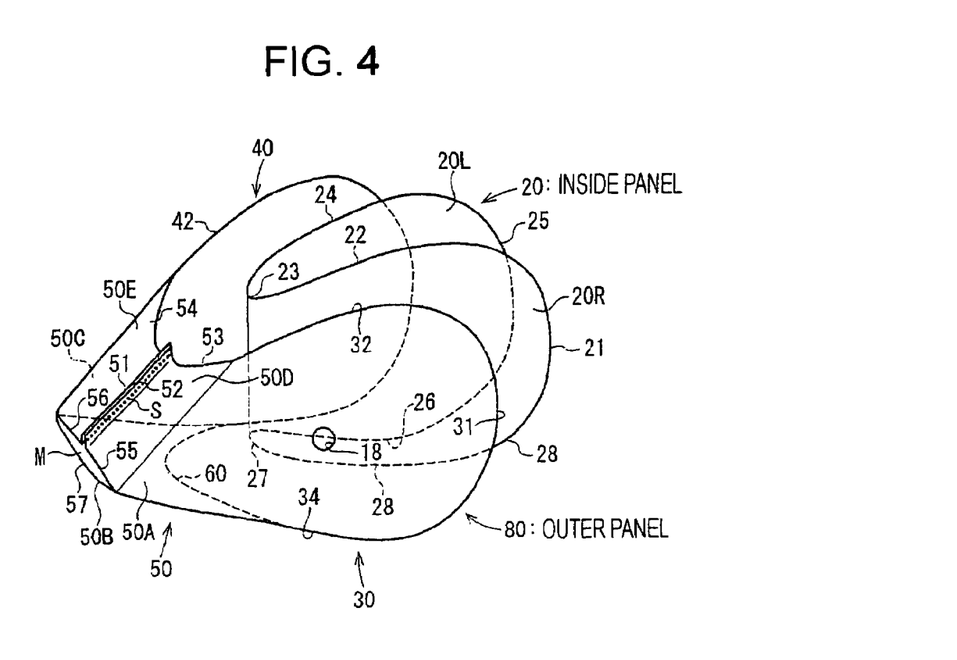
Figure 5:
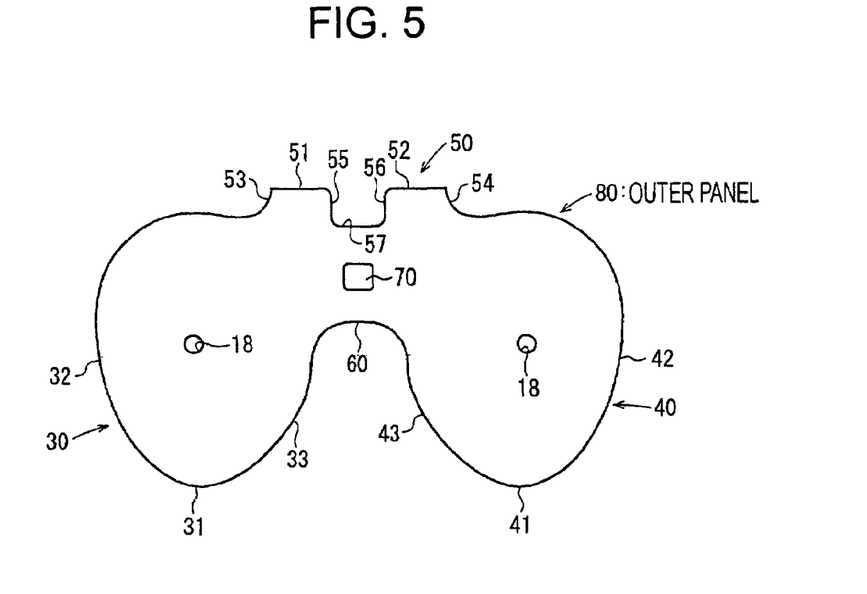
FIG. 5 is a plan view illustrating an outer panel of the airbag.

Next, as shown in FIG. 4, the right outer surface 30 of the outer panel 80 and the right side 20R of the inside panel 20 face each other, and each of the tip end hems 21 and 31, each of the upper hems 22 and 32, and each of the lower hems 28 and 34 are respectively stitched. In a similar manner, the left outer surface 40 of the outer panel 80 and the left side 20L of the inside panel 20 face each other, and each of the tip end hems 25 and 41, each of the upper hems 24 and 42, and each of the lower hems 26 and 44 are respectively stitched. Further, the flap front side hems 53 and 54 of the mouth surface 50 of the outer panel 80 are stitched on the vicinity of the upper hem 23 in the vicinity of the folded-back portion of the inside panel 20. In addition, the front side hem 60 of the bottom portion of the mouth surface 50 is stitched on the vicinity of the lower hem 27 in the vicinity of the folded-back portion.

By these stitching operations described above, a condition where a front and back sides of the airbag 10 (in FIG. 1) are reversed, namely a condition where a seam allowance is exposed to an obverse side of the airbag 10 is made. As shown in FIG. 4, the flap rear side hems 55 and 56 of the mouth surface 50, and the rear hem 57 are not yet stitched, and in this condition, the same serves as an open opening M.

Figure 1:
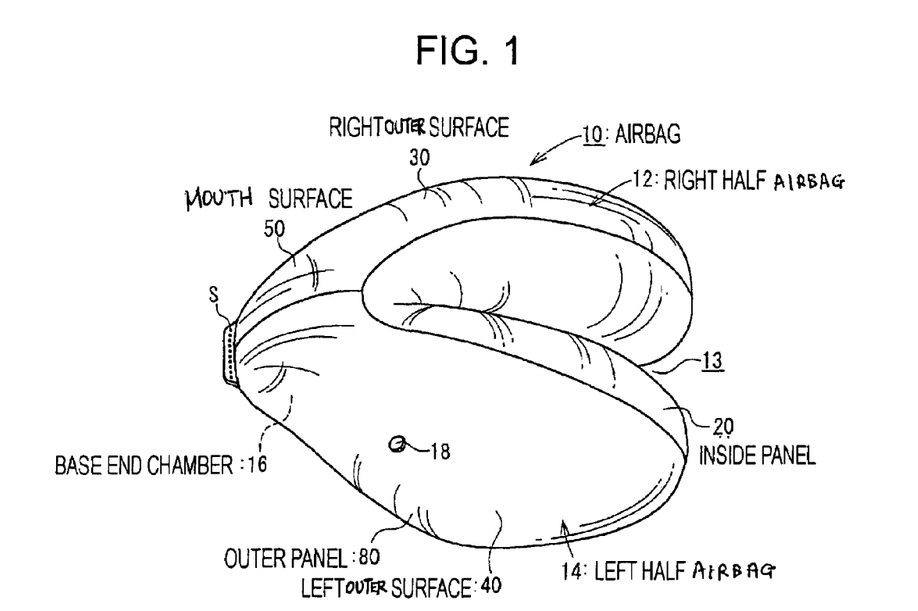
FIG. 1 is a perspective view illustrating an inflated condition of an airbag according to an embodiment of the present invention.

Therefore, the front and back sides of the airbag 10 are reversed through the open opening M. Next, the airbag 10 shown in FIG. 1 is completed by stitching the open opening M.

Figure 2:
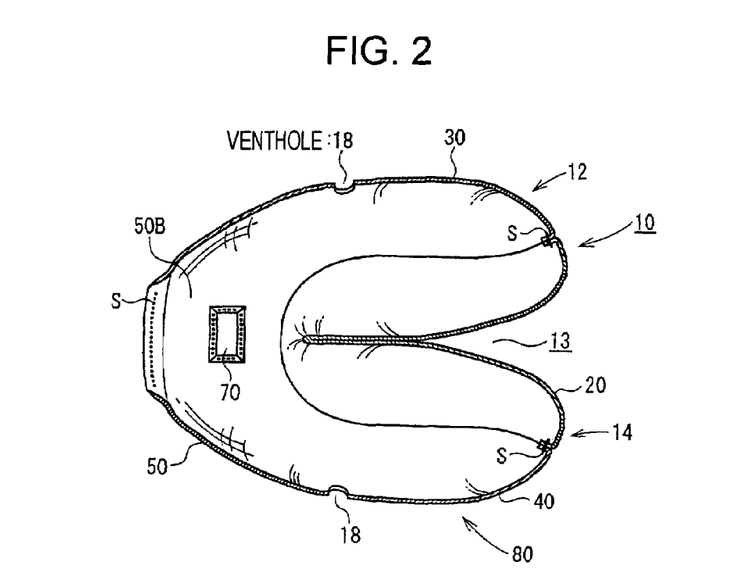
FIG. 2 is a horizontal cross-sectional view illustrating the airbag.
Figure 3:
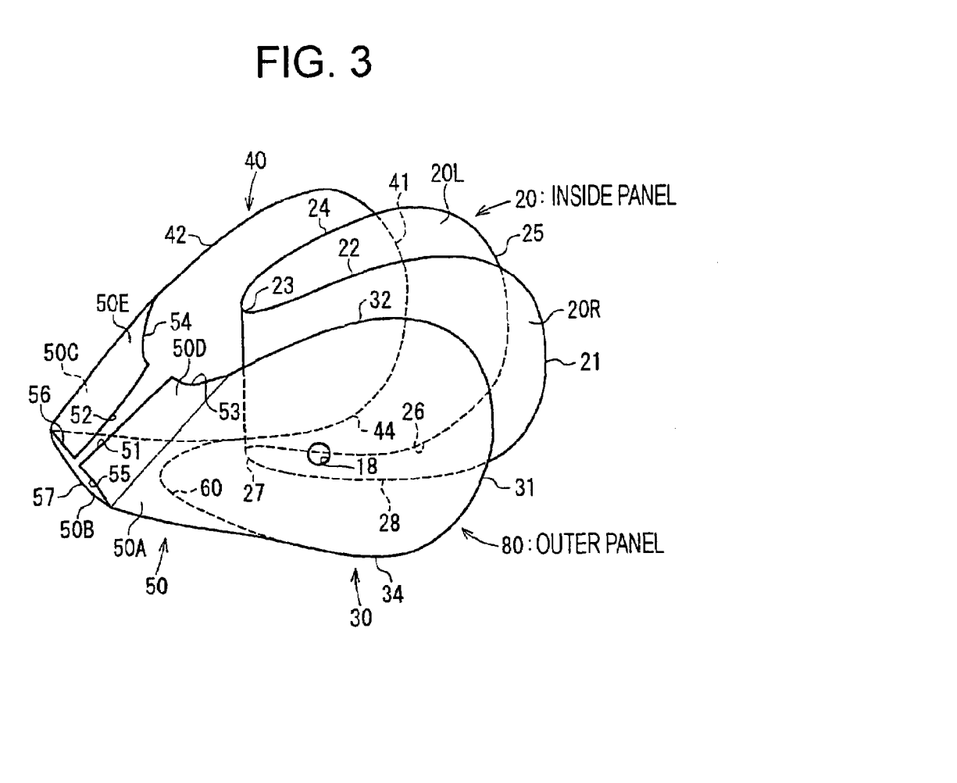
FIGS. 3 and 4 are exploded perspective views illustrating the airbag.

Incidentally, as shown in FIG. 2, an opening 70 for introducing gas from an inflator is provided in the bottom surface 50B of the mouth surface 50. From a peripheral edge portion of the opening 70, a flap for connecting a peripheral edge portion of the opening 70 to a case of an airbag apparatus described later is projected.

As described above, since the airbag 10 is constructed by two sheets of the panels 20 and 80, a stitching trouble is saved.

Specifically, the outer panel 80 of the airbag 10 has a construction in which left and right outside panels (corresponding to the right outer surface 30 and the left outer surface 40, of the outer panel 80) and a base end side panel (corresponding to the mouth surface 50 of the outer panel 80) in the above-described Japanese Unexamined Patent Application Publication No. 2004-244005 are formed into a successive and integral one sheet. Accordingly, in the airbag 10, the trouble for stitching the outside panel and the base end side panel is saved and a stitching cost is reduced compared to the airbag in Japanese Unexamined Patent Application Publication No. 2004-244005. Further, weight of the airbag 10 is also reduced by an extent of the saved seam allowance and a stitching thread.

The airbag 10 is mounted on a passenger airbag apparatus for protecting an occupant seated on a passenger seat of an automobile in collision of a motor vehicle.

The passenger airbag apparatus may be provided with a case having a container shape for housing an airbag 10, and the inflator for inflating the airbag 10. The inflator is disposed in a case. A peripheral edge portion of the opening 70 is connected to a peripheral edge portion of an airbag attaching opening of the case via the aforementioned flap, and the airbag 10 is folded back and housed in the case. Further, the airbag apparatus is constructed by that a lid is mounted in the case in a manner so as to cover a folded-back body of the airbag 10. Incidentally, the lid is configured to be ruptured by pressing force from the airbag 10 when the airbag 10 is inflated.

The airbag apparatus is installed in an opening for installing the airbag apparatus provided at an upper surface of an instrumental panel in front of the passenger seat of the automobile.

An operation of the airbag apparatus is as follows. In a case that the automobile where the airbag apparatus is mounted is in collision, the aforementioned inflator is activated for blowing out the gas. The gas from the inflator inflates the base end chamber 16 first, then flows into the right half airbag 12 and the left half airbag 14, and inflates the same.

In the airbag 10, the base end chamber 16 inflated earlier is brought into contact with the instrumental panel and the posture of the base end chamber 16 is stable. Therefore, postures of the right half airbag 12 and that of the left half airbag 14 are stable not only in completion of the inflating operation but also in a halfway of the inflating operation.

Further, since the gas is approximately uniformly supplied from the inflated base end chamber 16 into the right half airbag 12 and the left half airbag 14, both the right half airbag 12 and the left half airbag 14 are smoothly and approximately uniformly inflated in left and right from an initial stage of the inflating operation.

In a condition of that the inflating operation of the airbag 10 is completed, a spatial portion 13 is formed in a valley shape between each of the tip end portions of the right half airbag 12 and the left half airbag 14, and the spatial portion 13 is opened toward the occupant. In addition, an occupant's right chest is caught by the inflated right half airbag 12, and an occupant's left chest is caught by the inflated left half airbag 14. Further, a portion in the vicinity of a breast bone faces the spatial portion 13. Therefore, reactive force applied to the portion in the vicinity of the breast bone at a time when the airbag catches the left and right chests becomes small.

As described above, in the airbag 10 and the airbag apparatus provided with the airbag 10, an excellent effect is exerted.

Figure 6:
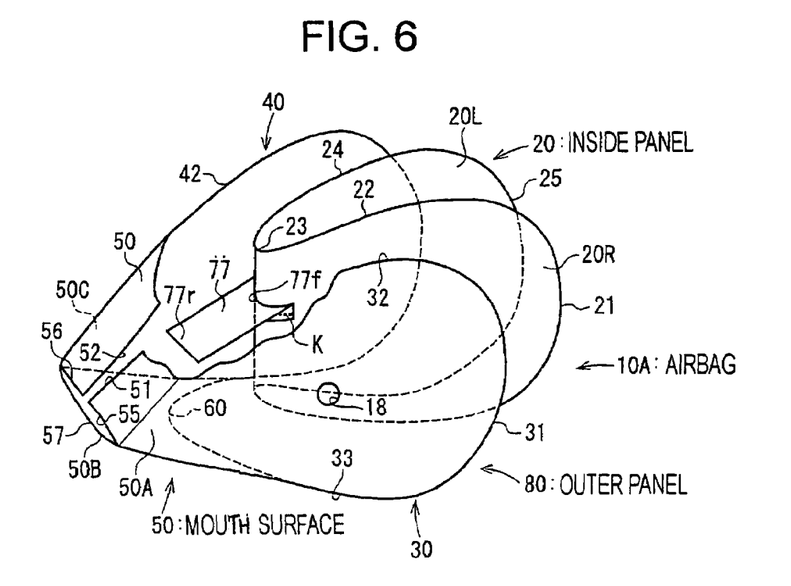
FIG. 6 is an exploded perspective view illustrating an airbag with respect to another embodiment.

In an airbag 10A, a base end side of the mouth surface 50 of the outer panel 80 in the condition where the airbag 10A is inflated, and a base end side of the inside panel 20 (in the vicinity of the folded-back portion of the inside panel 20) are tethered up by means of a tether 77. By providing the tether 77, a projecting-out operation of the deepest portion of the valley of the airbag 10A is limited and a position of the deepest portion of the valley can be defined. Thereby, an inflating time of the airbag 10A can be aimed at being reduced.

Figure 8:
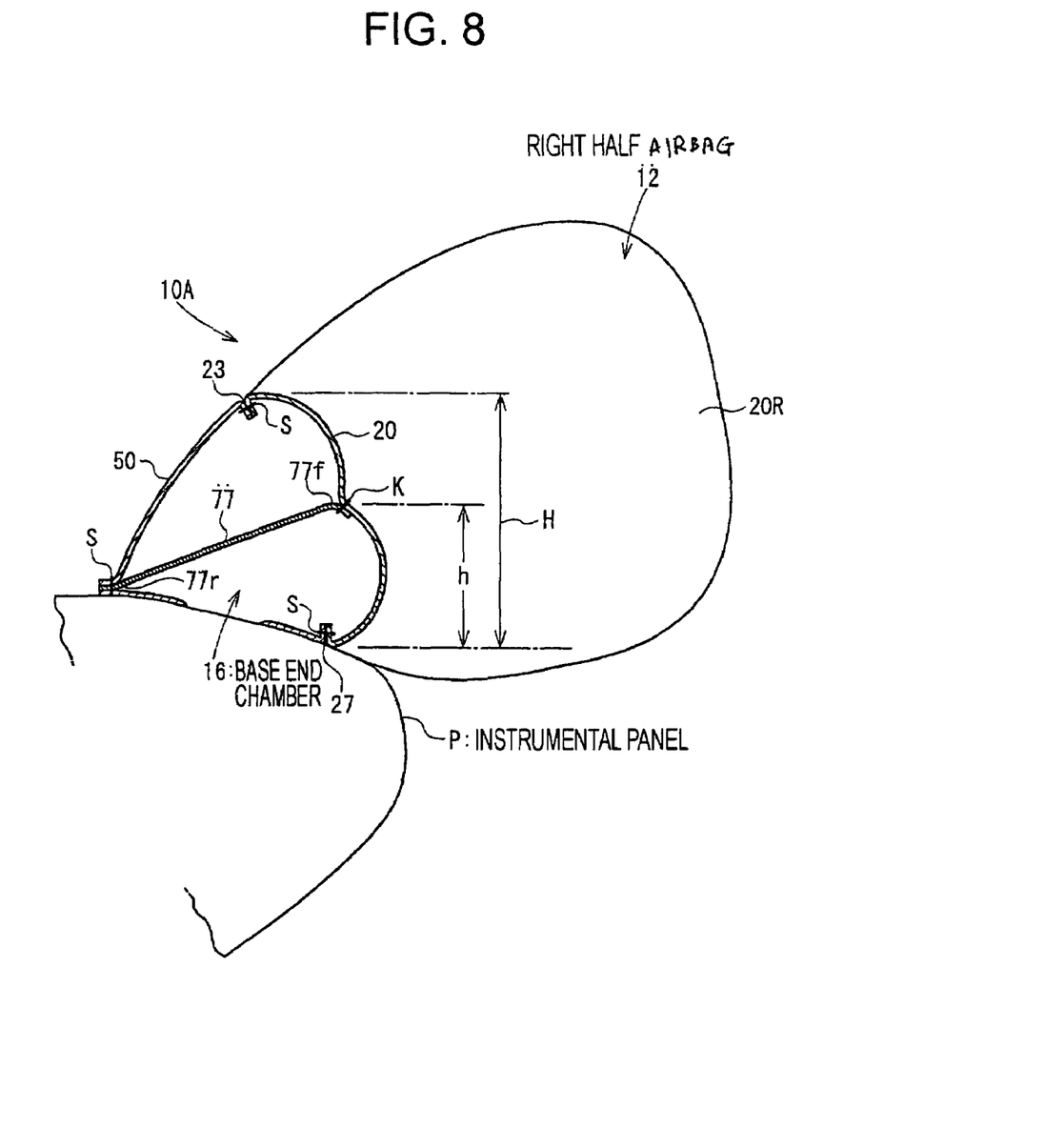
FIG. 8 is a longitudinal cross-sectional view in the vicinity of a middle portion in a left and right direction of the airbag.

Incidentally, in this embodiment, as shown in FIG. 8, a front end portion 77f of the tether 77 is stitched on a position in the middle in an upper and lower direction of a base end portion of the inside panel 20 by means of a seam K. A base end portion 77r of the tether 77 is sandwiched between the flap rear side hems 55 and 56 of the mouth surface 50, and the rear hem 57, and is integrally stitched with the same by means of a seam S.

Figure 7:
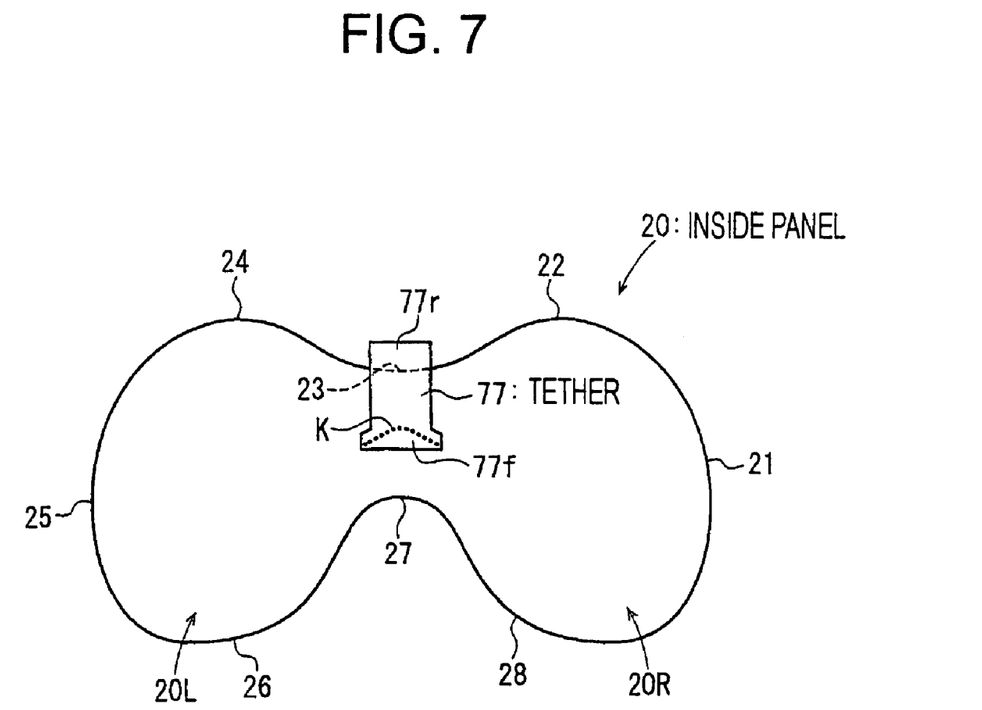
FIG. 7 is a plan view illustrating an inside panel of the airbag.

In this embodiment, as shown in FIG. 7, the seam K is curved in a manner such that the closer a position in the seam K moves to the middle side in a width direction of the tether 77, the closer the position approaches the base end portion 77r side of the tether 77. By thus forming, when the airbag 10A is inflated, a tail end of the front end portion 77f of the tether 77 is formed to have a concave curved shape along a curved surface of the base end side of the inside panel 20. Therefore, excessive force is difficult to be regionally applied to the seam K, and durability of the seam K becomes preferable.

In the present invention, as shown in FIG. 8, in a condition where the airbag 10A is inflated, when a height in the base end side of the inside panel 20 from the lower hem 27 to the upper hem 23 is defined as H, and a height from the lower hem 27 to a stitching position of the tether 77 (seam K) of the inside panel 20 is defined as h, it is preferable to construct to satisfy a formula, in which h=about 0.2H or higher, and specifically, h=from about 0.2H to about 0.8H. By thus constructing, when the airbag 10A is inflated, the lower portion side of the base end chamber 16 is satisfactorily inflated forward, a contacting square measure of the base end chamber 16 and the instrumental panel P (in FIG. 8) increases, and the posture of the bases end chamber 16 becomes stable.

When the height h of the stitching position of the tether 77 relative to the base end portion of the inside panel 20 is set to be about 0.2H or less, a frontward inflation at a lower side of the base end chamber 16 is limited when the airbag 10A is inflated, and the contacting square measure of the base end chamber 16 and the instrumental panel P is reduced. Thereby, a posture of the base end chamber 16 becomes difficult to be stable.

Incidentally, in a case that the base end side of the mouth surface 50 of the outer panel 80 and the base end side of the inside panel 20 are not tethered with the tether 77, when the airbag 10A is inflated, the closer a position moves to the vicinity of a middle portion (in the vicinity of a position at a height of about 0.5H from the lower hem 27) in an upper and lower direction of the base end side of the inside panel 20, the further the base end side of the inside panel 20 is inflated out forward. Accordingly, in the present invention, it is specifically preferable that the height h of the stitching position of the tether 77 relative to the base end portion of the inside panel 20 is set to be about 0.5H. By thus constructing, when the airbag 10A is inflated, an inflating operation in the vicinity of a middle portion in the upper and lower direction of the base end chamber 16 is limited, and thereby the upper portion side of the base end chamber 16 and the lower portion side of the same become to be inflated in a well-balanced manner. Thereby, the posture of the base end chamber 16 is further stable.

Although a detailed illustration is omitted, in this embodiment, as a tether 77, an elongated belt-shaped member having a length of about two times of a required length is folded in a twofold manner and formed into a two-ply shape is used. Therefore, the tether 77 has high strength compared to a one-sheet member. However, a reinforcing structure of the tether 77 is not limited thereto, and for example, a member where a plurality of sheets of a belt-shaped member having a required length is lapped together may be applicable.

Other construction of this embodiment is similar to that in the aforementioned embodiment in FIGS. 1 through 5, and the numerals in FIGS. 6 through 8, which are the same as that in FIGS. 1 through 5, denote the same elements as that in FIGS. 1 through 5.

Figure 9:
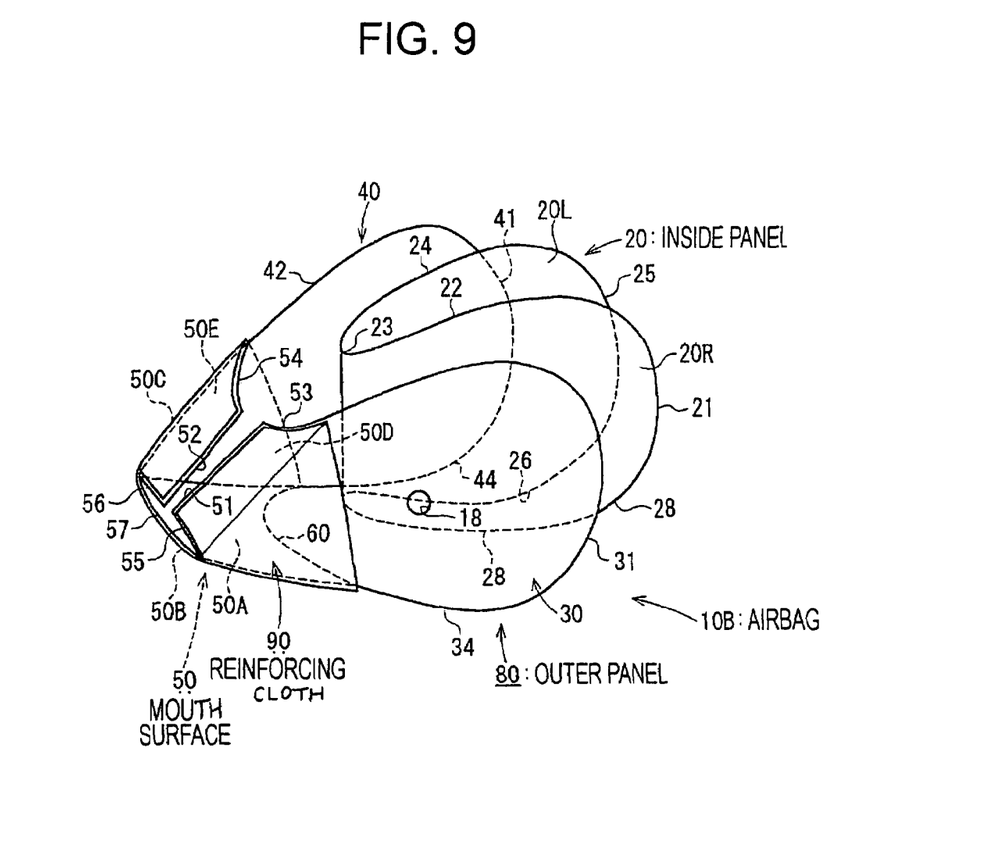
FIG. 9 is an exploded perspective view illustrating an airbag with respect to a still another embodiment.

FIG. 9 is an exploded perspective view illustrating an airbag with respect to a still another embodiment. In an airbag 10B, a reinforcing cloth 90 is provided so as to cover an outer surface of the mouth surface 50 in the outer panel 80. This reinforcing cloth 90 is formed to have a shape such as that the right outer surface 30 and the left outer surface 40 are omitted from the outer panel 80, and only the mouth surface 50 is left. The reinforcing cloth 90 covers approximately entire mouth surface 50. However, the shape of the reinforcing cloth 90 is not limited thereto, and, for example, the shape of the reinforcing cloth 90 may be that regionally covers a peripheral edge region of the opening 70 for introducing gas, or other region (one or a plurality of places may be applicable) in the mouth surface 50. Further, the reinforcing cloth may be provided straddling the left and right outer surfaces 30 and 40, or the inside panel 20.

By thus constructing, durability for friction between the mouth surface 50 and the instrumental panel, a windshield, or the like in inflation of the airbag, durability for high-temperature gas from the inflator that flows into the base end chamber 16, or durability for internal pressure of the airbag 10B, is improved.

Other construction of this embodiment is similar to that in the embodiment shown in the above-described FIGS. 1 through 5.

Any of the aforementioned embodiments is only an example of the present invention, and the present invention can adopt a configuration other than that illustrated. For example, each of middle portions of the right half airbag 12 and the left half airbag 14 may be connected via a panel, a strap, or a net.

In the present invention, the right half airbag 12 and the left half airbag 14 may be formed into symmetrical shape, or may not be formed into symmetrical shape. Further, capacities of each of the right half airbag 12 and the left half airbag 14 may be identical or different from each other.

For example, in insides of the right half airbag 12 and the left half airbag 14, tethers for tethering the right side 20R or the left side 20L of the inside panel 20, and a right outer surface 30 or the left outer surface 40 of the outer panel 80 may respectively be provided, and an inflating shape of the right half airbag 12 and the left half airbag 14 may thereby be also limited.

Although each of the aforementioned embodiment shows examples where the present invention is applied to a passenger airbag and an airbag apparatus, the present invention is applicable for various types of airbags and airbag apparatuses other than the above-described, such as that for use in a driver's seat, or the like.

The above disclosed apparatus has several advantages. In the thus described airbag, the trouble for stitching the outside panel and the base end side panel is saved and a stitching cost is reduced compared to the airbag in Japanese Unexamined Patent Application Publication No. 2004-244005. Further, weight of the airbag is also reduced by an extent of the saved seam allowance and a stitching thread.

Incidentally, in the airbag according to the present invention, when the inflator is activated, the base end chamber at the base end side is inflated first, and then the left half airbag and the right half airbag are inflated. The base end chamber at the base end side, inflated earlier, is brought into contact with a vehicle body member such as an instrumental panel or the like, and a posture thereof is brought to be stable. Therefore, postures of the left half airbag and that of the right half airbag are stable not only in completion of an inflating operation but also in a halfway of the inflating operation.

Further, the gas is supplied to each of the left half and right half airbags from the base end chamber, even when the inflator is that of a type where a larger amount of the gas is blown out toward either one of the left side and right side compared to the other side, the gas is approximately uniformly supplied to the left half airbag and the right half airbag, and the same are brought to be approximately uniformly inflated.

In the disclosed device, a construction may be formed such that an upper edge of the left outer surface and an upper edge of the right outer surface of an outer panel are connected to an upper edge of the inside panel, and a lower edge of the left outer surface and a lower edge of the right outer surface are connected to a lower edge of the inside panel, and a tip end edge of the left outer surface and a tip end edge of the right outer surface are connected to a tip end edge of the inside panel, and the mouth surface of the outer panel is connected to an upper edge of a base end portion of the inside panel and a lower edge of the base end portion thereof. According to the construction described above, a connecting operation for the airbag can be performed with ease by a stitching operation or the like.

In the present invention, in an inflated condition of the airbag, a tether for connecting the base end portion of the inside panel and the base end portion of the mouth surface of the outer panel may be provided. By providing the tether, a base end position of the inside panel in inflation of the airbag can be formed to a predetermined position. Further, the base end position of the inside panel can be brought to be in close contact with a base end side of the airbag. In a case that the base end position of the inside panel is brought to be in close contact with the base end side of the airbag, a valley (spatial portion) between the left half airbag and the right half airbag becomes deep.

Furthermore, in the inflated condition of the airbag, when a height of the connecting position of the tether relative to the base end portion of the inside panel is set to be 0.2H or less.

When the height of the connecting position of the tether relative to the base end portion of the inside panel is set to be about 0.2H or less, the inflating operation of the airbag at a lower side of the base end chamber is limited when the airbag is inflated. Thereby, a posture of the base end chamber becomes difficult to be stable.

In the airbag according to the present invention, it is preferable to construct such that each of tip end portions of the left half airbag and the right half airbag is formed to be a non-coupled-up shape, and a spatial portion opened to an occupant is formed in a valley shape between each of tip end portions of the left half airbag and the right half airbag in the inflated condition of the airbag.

In a case that the airbag is inflated, an occupant's left chest is caught by the left half airbag, and an occupant's right chest is caught by the right half airbag. Hard and strong rib bones exist in the left and right chests. The airbag receives the occupant via the rib bones, and absorbs the same. In the airbag, the valley-shaped spatial portion exists between each of the tip end portions of the left half airbag and the right half airbag in the inflated condition, and a portion in the vicinity of a chest bone at a center of the chest of the occupant faces the spatial portion. Accordingly, in a case that a body of the occupant dashed to the airbag, a portion in the vicinity of the chest bone of the chest does not receive very large reactive force from the airbag. This results in reduction of a burden in the vicinity of the chest bone. The aforementioned tether and deepened valley of the left half airbag and the right half airbag contribute to the reduction of the burden in the vicinity of the chest portion.

In the disclosed device, when a distance between each of the most tip ends of the left half airbag and the right half airbag is set to be from about 150 mm to about 450 mm in the inflated condition of the airbag, the inflated left half airbag is brought to face aright in the vicinity of a center of the left chest, and the right half airbag is brought to face aright in the vicinity of a center of the right chest. Thereby, a portion in the vicinity of the rib bone of the upper half of the body of the occupant is received by the airbag. Further, when a distance in a horizontal direction from the most tip end to the deepest portion of the spatial portion between the left half airbag and the right half airbag is set to be from about 280 mm to about 480 mm, the burden applied to the vicinity of the chest bone is brought to be small.

Japan Priority Application 2006-240518, filed Sep. 5, 2006 including the specification, drawings, claims and abstract, is incorporated herein by reference in its entirety.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. An airbag inflated in a direction where a tip end side of the airbag recedes from a base end side by blowing-out gas of an inflator disposed at the base end side, comprising:
    a base end chamber disposed at the base end side;
    a left half airbag continuing into the base end chamber, and inflated at a left side in front of an occupant; and
    a right half airbag continuing into the base end chamber, and inflated at a right side in front of the occupant,
wherein the airbag includes:
    an inside panel extending from a tip end of the right half airbag up to a tip end of the left half airbag, while passing through each facing surface of both the right half airbag and the left half airbag; and
    a one-sheet outer panel constituting a right outer surface of the right half airbag, a left outer surface of the left half airbag, and a mouth surface,
wherein the mouth surface includes a right side surface, a bottom surface, a left side surface, and an upper surface comprising a right flap joined to a left flap.

2. The airbag according to claim 1, wherein an upper edge of the left outer surface and an upper edge of the right outer surface are connected to an upper edge of the inside panel, and wherein a lower edge of the left outer surface and a lower edge of the right outer surface are connected to a lower edge of the inside panel, and wherein a tip end edge of the left outer surface and a tip end edge of the right outer surface are connected to a tip end edge of the inside panel, and wherein the mouth surface is connected to an upper edge of a base end portion of the inside panel and a lower edge of the base end portion of the inside panel.

3. The airbag according to claim 1, comprising a tether for coupling a base end portion of the inside panel and a base end portion of the mouth surface together in an inflated condition of the airbag.

4. The airbag according to claim 3, wherein when a height from a lower edge of the base end portion of the inside panel to an upper edge of the base end portion of the inside panel is defined as H, the tether is connected to a position at a height of about 0.2 H or higher from the lower edge of the base end portion in the base end portion of the inside panel in the inflated condition of the airbag.

5. The airbag according to claim 1, wherein a reinforcing cloth is attached to the mouth surface.

6. The airbag according to claim 1, wherein tip end portions of the left half airbag and the right half airbag are not connected to each other, and wherein a spatial portion opened to the occupant is formed between the tip end portions of the left half airbag and the right half airbag in an inflated condition of the airbag.

7. The airbag according to claim 6, wherein in the inflated condition of the airbag, a distance between each of the most tip end of the left half airbag and the most tip end of the right half airbag is set to be from about 150 mm to about 450 mm, and wherein a distance in a horizontal direction from the most tip end to the deepest portion of the spatial portion is set to be from about 280 mm to about 480 mm.

8. An airbag apparatus comprising:
    an airbag; and
    an inflator, disposed at a base end side of the airbag, for inflating the airbag, wherein the airbag comprises:
        a base end chamber disposed at the base end side;
        a left half airbag continuing into the base end chamber, and inflated at a left side in front of an occupant; and
        a right half airbag continuing into the base end chamber, and inflated at a right side in front of the occupant,
    wherein the airbag is formed of:
        an inside panel extending from a tip end of the right half airbag up to a tip end of the left half airbag, while passing through each facing surface of both the right half airbag and the left half airbag; and
        a one-sheet outer panel constituting a right outer surface of the right half airbag, a left outer surface of the left half airbag, and a mouth surfaces wherein the mouth surface includes a right side surface, a bottom surface, a left side surface, and an upper surface comprising a right flap joined to a left flap.

9. The airbag apparatus according to claim 8, wherein an upper edge of the left outer surface and an upper edge of the right outer surface are connected to an upper edge of the inside panel, and wherein a lower edge of the left outer surface and a lower edge of the right outer surface are connected to a lower edge of the inside panel, and wherein a tip end edge of the left outer surface and a tip end edge of the right outer surface are connected to a tip end edge of the inside panel, and wherein the mouth surface is connected to an upper edge of a base end portion of the inside panel and a lower edge of the base end portion of the inside panel.

10. The airbag apparatus according to claim 8, comprising a tether for coupling a base end portion of the inside panel and a base end portion of the mouth surface together in an inflated condition of the airbag.

11. The airbag apparatus according to claim 10, wherein when a height from a lower edge of the base end portion of the inside panel to an upper edge of the base end portion of the inside panel is defined as H, the tether is connected to a position at a height of about 0.2 H or higher from the lower edge of the base end portion in the base end portion of the inside panel in the inflated condition of the airbag.

12. The airbag apparatus according to claim 8, wherein a reinforcing cloth is attached to the mouth surface.

13. The airbag apparatus according to claim 8, wherein tip end portions of the left half airbag and the right half airbag are not connected to each other, and wherein a spatial portion opened to an occupant is formed between the tip end portions of the left half airbag and the right half airbag in an inflated condition of the airbag.

14. The airbag apparatus according to claim 13, wherein in the inflated condition of the airbag, a distance between each of the most tip end of the left half airbag and the most tip end of the right half airbag is set to be from about 150 mm to about 450 mm, and wherein a distance in a horizontal direction from the most tip end to the deepest portion of the spatial portion is set to be from about 280 mm to about 480 mm.

15. A motor vehicle, comprising:
an airbag apparatus,
wherein the airbag apparatus comprises:
an airbag; and
an inflator, disposed at a base end side of the airbag, for inflating the airbag,
wherein the airbag comprises:
a base end chamber disposed at the base end side:
a left half airbag continuing into the base end chamber, and inflated at a left side in front of an occupant; and
a right half airbag continuing into the base end chamber, and inflated at a right side in front of the occupant,
wherein the airbag is formed of:
an inside panel extending from a tip end of the right half airbag up to a tip end of the left half airbag, while passing through each facing surface of both the right half airbag and the left half airbag; and
a one-sheet outer panel constituting a right outer surface of the right half airbag, a left outer surface of the left half airbag, and a mouth surface,
wherein the mouth surface includes a right side surface, a bottom surface, a left side surface, and an upper surface comprising a right flap joined to a left flap.

16. The airbag according to claim 1, wherein each of the right side surface and the left side surface is folded into approximately a triangle.

17. The airbag according to claim 1, wherein facing hems of each of the right and left flaps are stitched together such that the right and left flaps are joined together.

18. The airbag apparatus according to claim 8, wherein each of the right side surface and the left side surface is folded into approximately a triangle.

19. The airbag apparatus according to claim 8, wherein facing hems of each of the right and left flaps are stitched together such that the right and left flaps are joined together.

20. An airbag inflated in a direction where a tip end side of the airbag recedes from a base end side by blowing-out gas of an inflator disposed at the base end side, comprising:
a base end chamber disposed at the base end side;
a left half airbag continuing into the base end chamber, and inflated at a left side in front of an occupant; and
a right half airbag continuing into the base end chamber, and inflated at a right side in front of the occupant,
wherein the airbag includes:
an inside panel extending from a tip end of the right half airbag up to a tip end of the left half airbag, while passing through each facing surface of both the right half airbag and the left half airbag; and
a one-sheet outer panel constituting a right outer surface of the right half airbag, a left outer surface of the left half airbag, and a mouth surface,
wherein a tether is provided for coupling the base end portion of the inside panel and a base end portion of the mouth surface together in an inflated condition of the airbag.

21. The airbag according to claim 20, wherein when a height from a lower edge of the base end portion of the inside panel to an upper edge of the base end portion of the inside panel is defined as H, the tether is connected to a position at a height of about 0.2 H or higher from the lower edge of the base end portion in the base end portion of the inside panel in the inflated condition of the airbag.

* * * * *